(12) United States Patent
Moon et al.

(10) Patent No.: US 10,532,364 B1
(45) Date of Patent: Jan. 14, 2020

(54) ELECTROSTATIC PRECIPITATOR MODULE AND DESULFURIZATION SYSTEM INCLUDING THE SAME

(71) Applicant: DOOSAN HEAVY INDUSTRIES & CONSTRUCTION CO., LTD., Changwon-si, Gyeongsangnam-do (KR)

(72) Inventors: Sangchul Moon, Seoul (KR); Jinwoon Lee, Gimhae-si (KR); Sangrin Lee, Changwon-si (KR); Joonhyuk Yim, Goyang-si (KR); Jaedong Hwang, Gunsan-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 0 days.

(21) Appl. No.: 16/215,610

(22) Filed: Dec. 10, 2018

(30) Foreign Application Priority Data

Oct. 4, 2018 (KR) .......................... 10-2018-0118517

(51) Int. Cl.
*B01D 53/02* (2006.01)
*B03C 3/017* (2006.01)
(Continued)

(52) U.S. Cl.
CPC ............. *B03C 3/017* (2013.01); *B01D 53/504* (2013.01); *B01D 53/80* (2013.01); *B03C 3/16* (2013.01);
(Continued)

(58) Field of Classification Search
CPC .. B03C 3/017; B03C 3/16; B03C 3/41; B03C 3/47; B03C 3/86; B01D 53/504;
(Continued)

(56) References Cited

U.S. PATENT DOCUMENTS

2010/0074828 A1  3/2010  Singh

FOREIGN PATENT DOCUMENTS

JP   2009220066 A  * 10/2009  ............... B03C 3/16
JP   2010-063966 A    3/2010
(Continued)

OTHER PUBLICATIONS

Translation of JP2010-63966; Mar. 2010, Sawai.*
(Continued)

*Primary Examiner* — Christopher P Jones
(74) *Attorney, Agent, or Firm* — Invenstone Patent, LLC

(57) ABSTRACT

An electrostatic precipitator module and a desulfurization system are capable of easily discharging wash water from a wet electrostatic precipitator module. The electrostatic precipitator module includes an arrangement of discharge electrodes and collecting electrodes alternately disposed and spaced apart from each other, the discharge electrodes configured to be charged to a predetermined voltage for generating a corona discharge between the discharge electrodes and the collecting electrodes; and tie rods for fixing the discharge electrodes and the collecting electrodes. Each collecting electrode has a lower edge inclined downward with respect to the ground. The lower edge of each collecting electrode includes separate lower edge portions respectively inclined downward from opposite side ends of the collecting electrode and a lowermost point at which wash water is concentrated and discharged to a discharge guide installed directly under the lowermost points. The discharge guide has a width substantially smaller than the collecting electrode.

12 Claims, 6 Drawing Sheets

(51) Int. Cl.
*B01D 53/80* (2006.01)
*B01D 53/50* (2006.01)
*B03C 3/16* (2006.01)
*B03C 3/47* (2006.01)
*B03C 3/86* (2006.01)
*B03C 3/41* (2006.01)

(52) U.S. Cl.
CPC .................. *B03C 3/41* (2013.01); *B03C 3/47* (2013.01); *B03C 3/86* (2013.01); *B01D 2251/11* (2013.01); *B01D 2251/404* (2013.01); *B01D 2251/606* (2013.01); *B01D 2257/302* (2013.01)

(58) Field of Classification Search
CPC ............... B01D 53/80; B01D 2251/11; B01D 2251/404; B01D 2251/606; B01D 257/302; B01D 2257/302
See application file for complete search history.

(56) References Cited

FOREIGN PATENT DOCUMENTS

| | | | | | |
|---|---|---|---|---|---|
| JP | 2010063966 | A | * | 3/2010 | ............... B03C 3/36 |
| KR | 20040020128 | A | * | 3/2004 | ............. B01D 50/00 |
| KR | 10-2009-0103400 | A | | 10/2009 | |
| KR | 10-1478770 | B1 | | 1/2015 | |
| KR | 10-2017-0076944 | A | | 7/2017 | |
| KR | 20170076944 | A | * | 7/2017 | ............... B03C 3/16 |
| KR | 10-1901572 | B1 | | 9/2018 | |
| KR | 1901572 | B1 | * | 9/2018 | ............... F01N 3/04 |

OTHER PUBLICATIONS

A Korean Office Action dated Jun. 3, 2019 in connection with Korean Patent Application No. 10-2018-0118517 which corresponds to the above-referenced U.S. application.

* cited by examiner

ELECTROSTATIC PRECIPITATOR MODULE AND DESULFURIZATION SYSTEM INCLUDING THE SAME

CROSS-REFERENCE TO RELATED APPLICATIONS

This application claims priority to Korean Patent Application No. 10-2018-0118517, filed on Oct. 4, 2018, the disclosure of which is incorporated herein by reference in its entirety.

BACKGROUND OF THE INVENTION

Field of the Invention

Exemplary embodiments of the present disclosure relate to an electrostatic precipitator module and a desulfurization system for collecting dust contained in exhaust gas and removing sulfur oxides.

Description of the Related Art

In general, acidic components, such as hydrogen chloride (HCl), sulfur oxides (SOx), or hydrogen fluoride (HF), in the exhaust gas generated during combustion of materials in boilers, steelworks, or the like of large incineration plants or thermal power plants are removed through various methods because they are harmful to humans and cause air pollution.

Among the methods of removing sulfur oxide in exhaust gas, the method of removing sulfur compounds in such a manner that a powder, such as slaked lime or activated carbon as a neutralizing agent is dryly injected into and comes into contact with exhaust gas in the process of discharging the exhaust gas is referred to as a dry desulfurization method, and the method of removing sulfur compounds in such a manner that an aqueous slurry of caustic soda, magnesium hydroxide, or limestone is used as a neutralizing agent and an absorption solution is sprayed onto and comes into contact with exhaust gas is referred to as a wet desulfurization method.

In wet desulfurization, exhaust gas comes into gas-liquid contact with an absorption fluid containing alkali such as lime, so that $SO_2$ is absorbed and removed from the exhaust gas. As a result, the $SO_2$ absorbed from the exhaust gas forms sulfite in the absorption fluid. In order to make the sulfite stable by oxidation, the method of oxidizing the sulfite by blowing air into an absorption fluid has commonly been practiced.

A commonly used wet flue gas desulfurization system is of a so-called oxidation tank type. In this type of wet flue gas desulfurization system, oxygen-containing gas (typically, air) is blown into a tank of an absorption tower, in which case the oxygen-containing gas comes into contact with a slurry (containing a calcium compound such as lime) having sulfur dioxide absorbed therein to oxidize the sulfur dioxide.

Dust is removed from the air discharged from the desulfurization system by the electrostatic precipitator. Typically, the electrostatic precipitator is installed separately from the desulfurization system to collect the dust contained in flue gas.

In general, particulate substances are charged by the corona discharge of discharge electrodes in the electrostatic precipitator and the charged particulate substances are collected on a collecting plate by electrostatic force. In a wet electrostatic precipitator, wash water is supplied to remove the dust adsorbed on a collecting plate and a tray for collecting the wash water is installed in the lower portion of an electrostatic precipitator module. However, the tray is problematic in that it obstructs the flow of exhaust gas and decreases the flow rate thereof.

RELATED ART DOCUMENT

[Patent Document]
(Patent Document 001) Korean Patent No. 10-1478770 (Jan. 5, 2015)

SUMMARY OF THE INVENTION

The present disclosure has been made in view of the above background, and an object thereof is to provide an electrostatic precipitator module and a desulfurization system capable of easily discharging wash water from a wet electrostatic precipitator module.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, an electrostatic precipitator module may include an arrangement of discharge electrodes and collecting electrodes alternately disposed and spaced apart from each other, the discharge electrodes configured to be charged to a predetermined voltage for generating a corona discharge between the discharge electrodes and the collecting electrodes; and tie rods for fixing the discharge electrodes and the collecting electrodes, and each of the collecting electrodes may have a lower edge inclined downward with respect to the ground.

The lower edge of each collecting electrode may include separate lower edge portions respectively inclined downward from opposite side ends of the collecting electrode.

The lower edge of each collecting electrode may include a lowermost point at which wash water flowing down from the collecting electrode is concentrated and discharged to a discharge guide installed directly under the lowermost points.

The discharge guide may have a width substantially smaller than that of the collecting electrode. The width of the discharge guide may range from $1/100$ to $1/10$ of that of the collecting electrode.

The discharge guide may extend in a stacking direction of the collecting electrodes and may have a bottom surface that decreases in height toward either extreme of the discharge guide.

Each collecting electrode may have a fixing hole formed near the lower edge to receive a hanger fixing rod.

The hanger fixing rod may be coupled with a support hanger for supporting the discharge guide. The support hanger may include a plurality of connection protrusions protruding upward for insertion of the lower portions of the respective collecting electrodes, and each of the connection protrusions may have a support hole formed for insertion of the hanger fixing rod.

The discharge guide may include two sidewalls and a bottom plate connected to lower portions of the sidewalls, and the discharge guide may have a plurality of support rings protruding upward from the sidewalls to be coupled to the hanger fixing rod.

The electrostatic precipitator module may further include a guide protrusion formed on a lower portion of each collecting electrode such that wash water flowing along surfaces of the collecting electrode is transferred toward the center of the collecting electrode, the guide protrusion extending in a width direction of the collecting electrode.

The electrostatic precipitator module may further include a first reinforcing rod that is fixedly installed at and protrudes from a lower portion of each discharge electrode and is configured to be inserted into slots formed in first setting beams respectively disposed at opposite ends of the first reinforcing rod. The first setting beams may be installed to pass through clearance grooves respectively formed in both ends of the lower side of each of the collecting electrodes.

The electrostatic precipitator module may further include a second reinforcing rod that is fixedly installed at and protrudes from an upper portion of each collecting electrode and is configured to be inserted into slots formed in second setting beams respectively disposed at opposite ends of the second reinforcing rod.

The tie rods may be inserted into the discharge electrodes to fix the discharge electrodes. The tie rods may include first tie rods passing through second holes formed in the collecting electrodes, and second tie rods inserted into the collecting electrodes to fix the collecting electrodes while passing through first holes formed in the discharge electrodes.

In accordance with another aspect of the present disclosure, a desulfurization system may include an absorption tower having an exhaust inlet and an exhaust outlet; a plurality of absorption solution supply pipes extending across the absorption tower, each absorption solution supply pipe having a spray nozzle; an electrostatic precipitator module disposed on the absorption solution supply pipes and comprising a plurality of discharge and collecting electrodes erected and arranged in a height direction of the absorption tower; and a wash water supply unit disposed on the electrostatic precipitator module. Each of the collecting electrodes may have a lower edge inclined downward with respect to the ground and a lowermost point at which wash water flowing down from the collecting electrode is concentrated.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
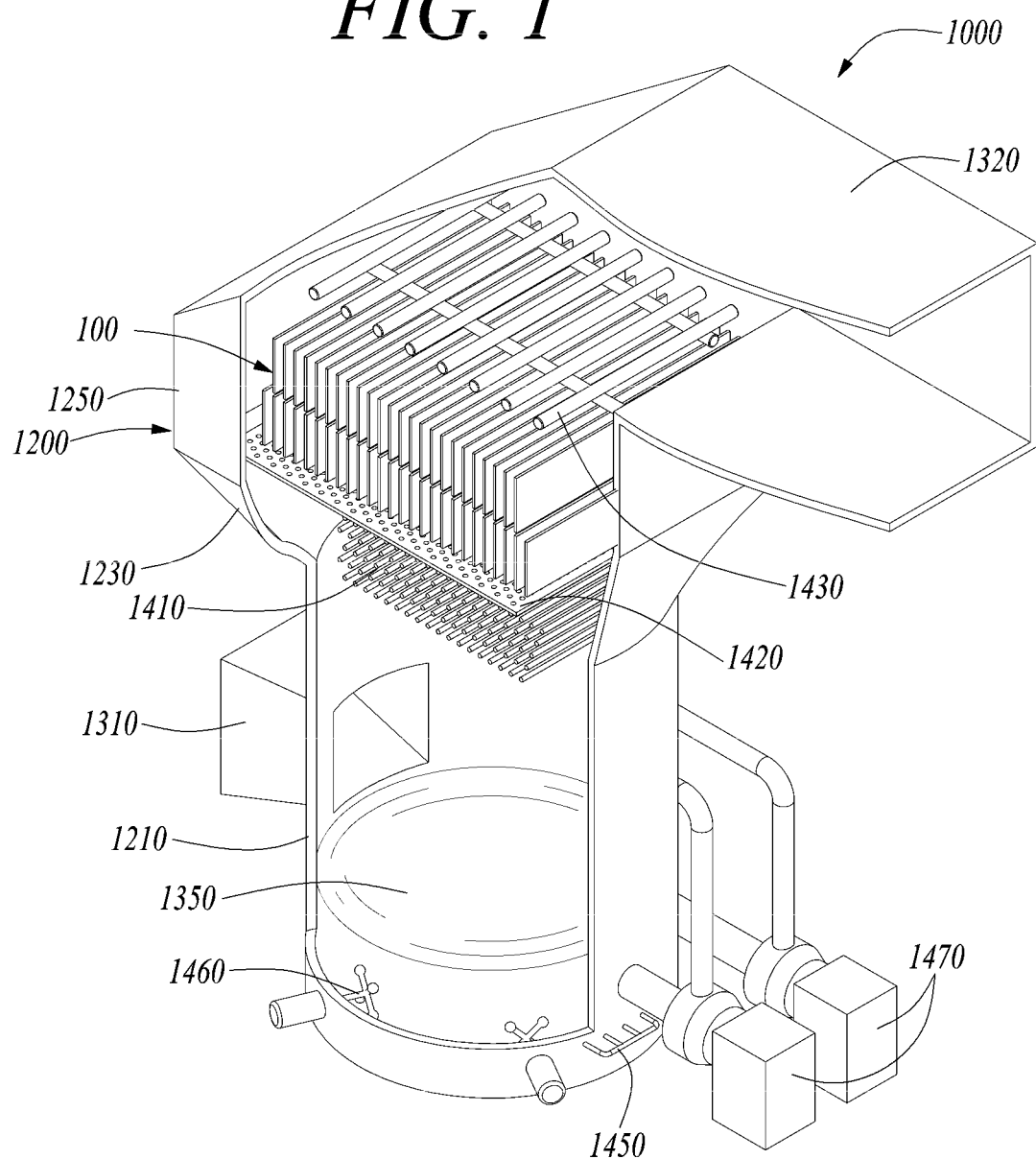
FIG. 1 is a view illustrating a desulfurization system according to a first embodiment of the present disclosure.

The present disclosure may be subjected to various modifications and have various embodiments. Specific embodiments are illustrated in the drawings and will be described in the detailed description of the present disclosure. However, this is not intended to limit the present disclosure to specific embodiments. It should be understood that the present disclosure includes all modifications, equivalents or replacements that fall within the spirit and technical scope of the present disclosure, and the scope of the present disclosure is not limited to the following embodiments.

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Exemplary embodiments of the present disclosure will be described below in more detail with reference to the accompanying drawings. Throughout the disclosure, like reference numerals refer to like parts throughout the various figures and embodiments of the present disclosure. In certain embodiments, detailed descriptions of functions and configurations well known in the art may be omitted to avoid obscuring appreciation of the disclosure by a person of ordinary skill in the art. For the same reason, some components may be exaggerated, omitted, or schematically illustrated in the accompanying drawings.

Hereinafter, a desulfurization system according to a first embodiment of the present disclosure will be described.

FIG. 1 illustrates a desulfurization system 1000 according to a first embodiment of the present disclosure. The desulfurization system 1000 is to remove sulfur oxides (SOx) contained in the exhaust gas discharged from boilers employed in a facility such as a thermal power plant. In the desulfurization system 1000, the sulfur compounds contained in exhaust gas are absorbed and removed through the gas-liquid contact between the exhaust gas and an absorption solution.

Referring to FIG. 1, the desulfurization system 1000 may include an absorption tower 1200, a plurality of absorption solution supply pipes 1410, a plurality of absorption solution pumps 1470, an agitator 1460, a plurality of oxidation air supply units 1450, and a perforated plate 1420.

The absorption tower 1200 has a columnar shape defining an internal space and is provided at a lower portion with an exhaust inlet 1310 and at an upper end with an exhaust outlet 1320, each communicating with the internal space. Exhaust gas is introduced to the absorption tower 1200 via the exhaust inlet 1310 and is discharged (exits) via the exhaust outlet 1320. In doing so, sulfur compounds and fine dust are removed from the exhaust gas exiting the absorption tower 1200. That is, the sulfur compounds and fine dust contained in exhaust gas are removed by the absorption tower 1200.

The exhaust inlet 1310 may have a tubular shape. The exhaust gas generated by the combustion of fossil fuel, such as coal consumed by a boiler or the like, is introduced into the absorption tower 1200 through the exhaust inlet 1310 and flows upward. The exhaust outlet 1320 may be a rectangular tube protruding laterally from the upper end of the absorption tower 1200.

The absorption tower 1200 includes a cylindrical section 1210 that has a circular cross-section, a rectangular column section 1250 that is disposed above the cylindrical section 1210 and has a rectangular cross-section, and an intermediate section 1230 that is disposed between the cylindrical section 1210 and the rectangular column section 1250. The exhaust inlet 1310 communicates with a lateral side of the cylindrical section 1210. The exhaust outlet 1320 communicates with an upper side of the rectangular column section 1250. The intermediate section 1230 has a contoured structure that includes a lower end having a circular cross-section for communicating with the cylindrical section 1210 and an upper end having a rectangular cross-section for communicating with the rectangular column section 1250.

The absorption solution supply pipes 1410 allow a limestone slurry, which is supplied to and stored in the lower portion of the absorption tower 1200, to be pumped and transferred upward by the absorption solution pump 1470 so that an absorption solution is sprayed as fine droplets through spray nozzles (not shown) installed at the upper portion of the absorption tower 1200. The sprayed absorption solution comes into contact and reacts with exhaust gas, and an unreacted portion of the absorption solution falls into the lower portion of the absorption tower 1200 where it is stored again to be recycled by the pumping of the absorption solution pump 1470.

A perforated plate (not shown) may be installed under the absorption solution supply pipes 1410, a region where sulfur-containing exhaust gas comes into contact and reacts with the fine droplets of the absorption solution being sprayed by the absorption solution supply pipes 1410. This region is called a spray zone. In the spray zone, the sulfurous acid gas contained in exhaust gas becomes sulfurous acid by the absorption reaction with water; the sulfurous acid produces calcium sulfite by the neutralization reaction with limestone; the produced calcium sulfite, the water, and the unreacted absorption solution fall and are stored; and the absorption solution is recycled.

The calcium sulfite produces plaster and sulfurous acid by the oxidation reaction with oxygen and water in a reservoir 1350 where the absorption solution is positioned in the lower portion of the absorption tower 1200, and the sulfurous acid produces plaster by the neutralization reaction with limestone again. For the oxidation reaction, the oxidation air supply units 1450 are connected at regular intervals around the side of the bottom of the absorption tower 1200.

The agitator 1460 is installed in the lower portion of the absorption tower 1200 to accelerate the reaction by stirring the limestone slurry. In addition, a slurry supply pipe (not shown) for supplying the slurry to the reservoir 1350 may be connected to the lower portion of the absorption tower 1200.

The perforated plate 1420 for blocking fine droplets may be installed above the absorption solution supply pipe 1410, specifically, in the intermediate section 1230.

Figure 2:
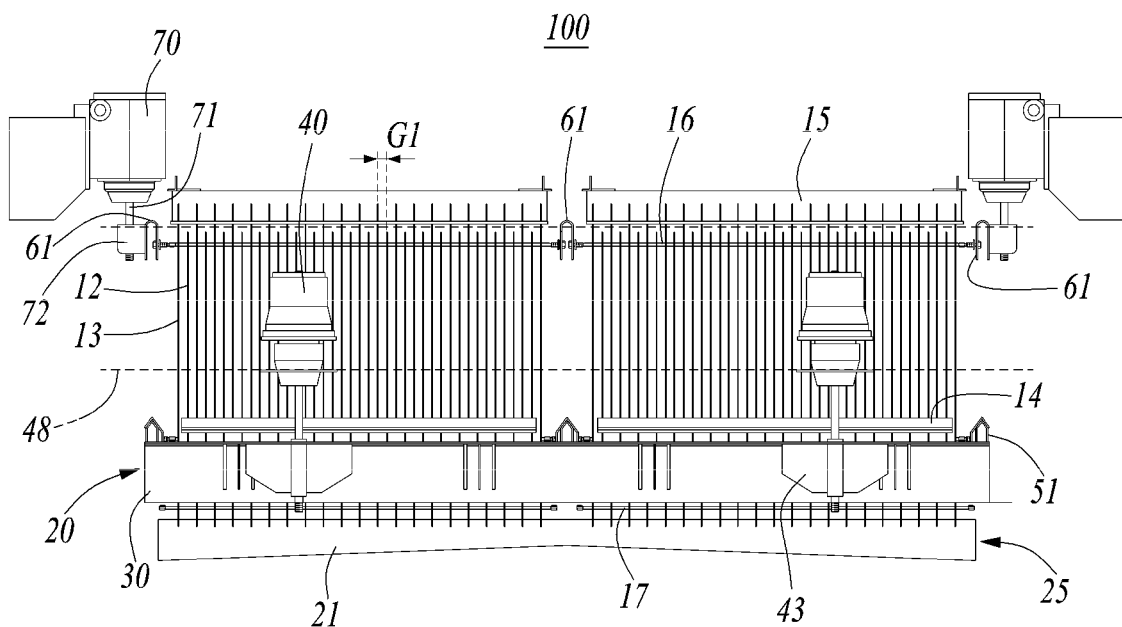
FIG. 2 is a side view illustrating an electrostatic precipitator module installed within the desulfurization system according to the first embodiment of the present disclosure.

An electrostatic precipitator module 100, together with a frame assembly 20 for supporting the electrostatic precipitator module 100 as shown in FIG. 2, is installed above the perforated plate 1420. The electrostatic precipitator module 100 may be configured such that a plurality of layers are stacked. In the present embodiment, the electrostatic precipitator module 100 is configured such that two layers are stacked, as shown in FIG. 1, though the present disclosure is not limited to this configuration. That is, the electrostatic precipitator module 100 may be configured such that a single layer is formed or two or more layers are stacked.

A wash water supply unit 1430 is installed above the electrostatic precipitator module 100 to remove dust adhered to collecting electrodes 13. The present disclosure is not limited to the configuration of the wash water supply unit 1430, which may be embodied by various known structures.

Figure 3:
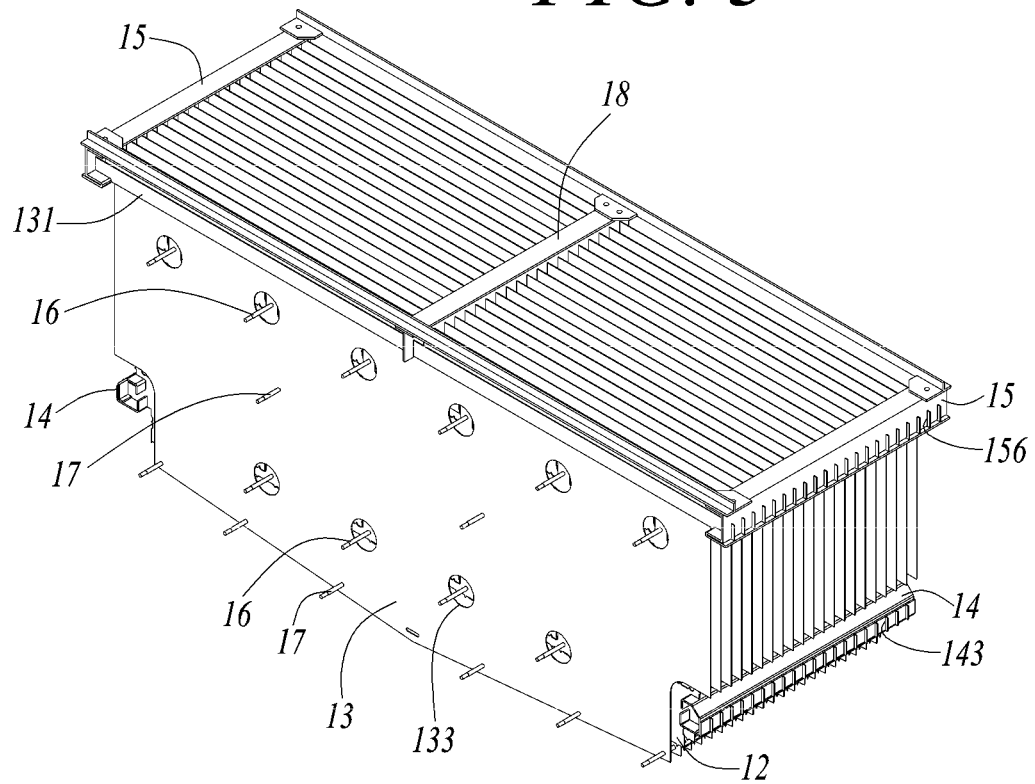
FIG. 3 is a perspective view illustrating the electrostatic precipitator module according to the first embodiment of the present disclosure.

FIG. 2 illustrates an electrostatic precipitator module 100 according to the first embodiment of the present disclosure, including a frame assembly 20, and FIG. 3 is a perspective view of the electrostatic precipitator module 100.

Referring to FIGS. 2 and 3, the electrostatic precipitator module 100 includes discharge and collecting electrodes 12 and 13, first tie rods 16, second tie rods 17, first setting beams 14, second setting beams 15, a center setting beam 18 (FIG. 3), a support hanger 25, and a discharge guide 21. The electrostatic precipitator module 100 may be installed on the frame assembly 20 in the absorption tower 1200 after being fixed by the several tie rods and the setting beams.

Figure 4:
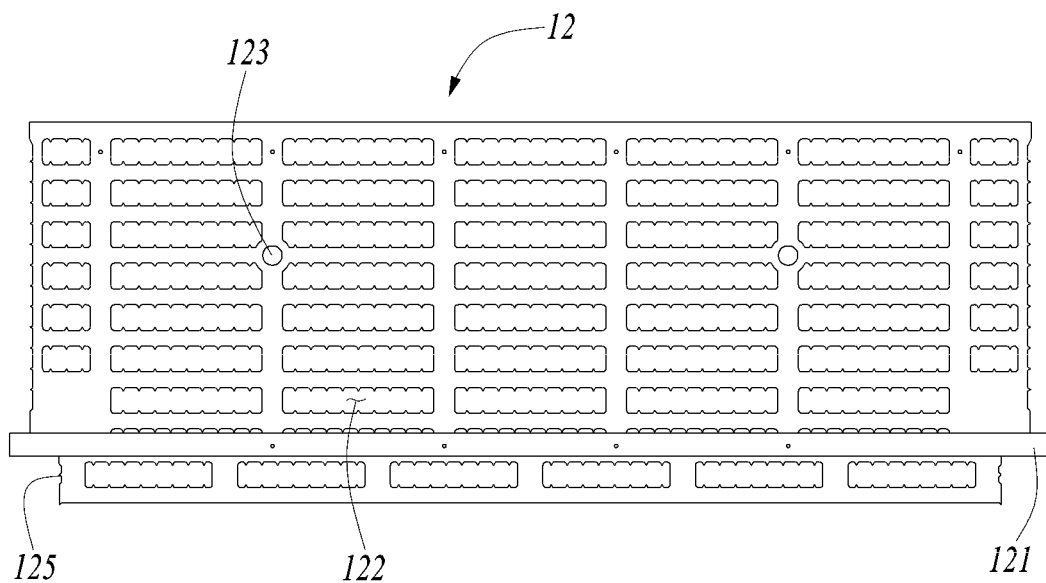
FIG. 4 is a front view illustrating one discharge electrode according to the first embodiment of the present disclosure.

FIG. 4 illustrates one of the discharge electrodes 12 according to the first embodiment of the present disclosure.

Referring to FIG. 4, each of the discharge electrodes 12 has the general shape of a flat plate forming one of a plurality of discharge fins which are spaced apart from each other, and each discharge electrode 12 is provided with a plurality of openings 122 throughout. Thus, the discharge fins are present and effective around each of the openings 122 as well as along the edges of the flat plate. Each opening 122 may have a substantially rectangular shape, and the discharge fins may each have a needle-shaped cross-section. The discharge electrode 12 may have a plurality of first holes 123 through which the second tie rods 17 pass.

A first reinforcing rod 121 is installed at the lower portion of the discharge electrode 12 and is respectively coupled at opposite ends to the first setting beams 14 to support the discharge electrode 12. The first reinforcing rod 121 is longer than a width of the discharge electrode 12 to protrude from both side ends of the discharge electrode 12.

Notches 125 are respectively formed at opposite sides of a lower portion of the discharge electrode 12 to accommodate installation of the first setting beams 14. The first reinforcing rod 121 is fixed onto the notches 125, so that the first reinforcing rod 121 and upper surfaces of the notches 125 may be inserted into and fixed to the first setting beams 14 together.

Figure 5:
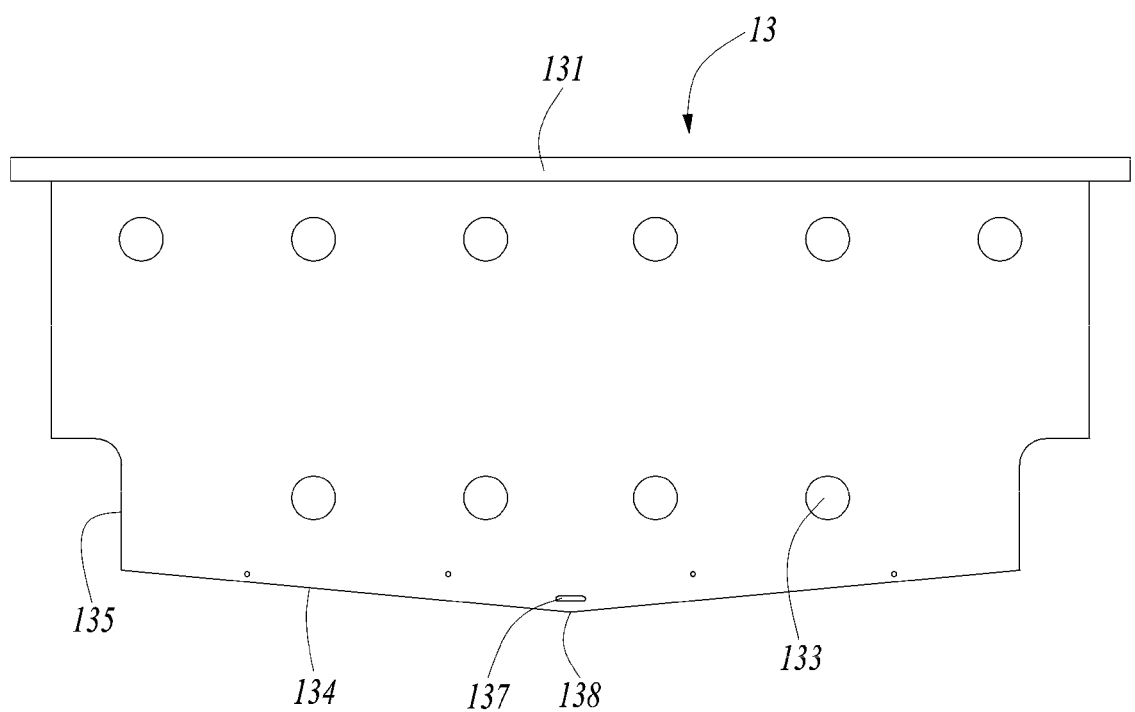
FIG. 5 is a front view illustrating one collecting electrode according to the first embodiment of the present disclosure.

FIG. 5 illustrates one of the collecting electrodes 13 according to the first embodiment of the present disclosure.

Referring to FIG. 5, each of the collecting electrodes 13 has the general shape of a flat plate and is provided with a plurality of second holes 133 through which the first tie rods 16 pass. To support the collecting electrodes 13, a second reinforcing rod 131 is disposed at an upper portion of each of the collecting electrodes 13. The second reinforcing rod 131 is longer than a width of the collecting electrode 13 and thus protrudes from both ends of the upper portion of the collecting electrode 13.

The plurality of discharge and collecting electrodes 12 and 13 are arranged in parallel with each other, and the discharge electrodes 12 are arranged at equal intervals between the pluralities of collecting electrodes 13. The plurality of discharge and collecting electrodes 12 and 13 erected and arranged in a height direction of the absorption tower 1200. The gap G1 between each of the collecting electrodes 13 and an associated one of the discharge electrodes 12 may be 50 mm to 70 mm.

A clearance groove 135 is formed in both ends of the lower side of each collecting electrode 13, and the first setting beams 14 are installed to pass through the clearance grooves 135. The upper ends of the avoidance grooves 135 are formed above the first reinforcing rod to prevent the short circuit between the collecting electrode 13 and the discharge electrode 12.

A high voltage is applied to the discharge electrode 12, thereby generating a corona discharge between the discharge electrode 12 and the collecting electrode 13 and generating an electrostatic force. In the present disclosure, a high voltage may be in a range of 10 KV to 120 KV. The discharge electrode 12 can be charged to a predetermined voltage, and the predetermined voltage may be in a range of 10 KV to 120 KV.

In other words, the electrostatic precipitator module 100 includes an arrangement of a plurality of the discharge electrodes 12 and a plurality of the collecting electrodes 13, which are alternately disposed and spaced apart from each other, and the discharge electrodes 12 are charged to a predetermined high voltage for generating a corona discharge between the electrodes 12 and 13.

During the flow of exhaust gas to the generation region of the corona discharge and the electrostatic force, particulate substances are charged by combination with the ions (electrons) generated by the corona discharge and the charged particulate substances adhere to the collecting electrodes 13 by the electrostatic force.

Each collecting electrode 13 may have a lower edge 134 inclined with respect to the ground, that is, inclined with respect to the force of gravity, and the discharge guide 21 for forming a channel is installed beneath a lowermost point 138 positioned at the bottom (downward) end of the inclined portion. Here, the inclined portion may be formed of the lower edge 134, and the lower edge (inclined edge) 134 may be constructed of two separate lower edge portions extending toward each other and thus combining to make up the width of an associated collecting electrode 13, as in the embodiments depicted in the drawings herein. Alternatively, the lower edge 134 may be constructed of a single and continuously configured lower edge extending the entire width direction of the associated collecting electrode 13. Thus, the lowermost point 138 may be disposed at a center of the collecting electrode 13, as in the embodiments depicted in the drawings herein, or may be disposed at one lateral extreme (side ends) or the other of the collecting electrode 13 in the width direction in the event of a single and continuously configured lower edge 134. On the other hand, in the event of two separate lower edge portions of unequal length, the lowermost point 138 may occur at an off-center point of the collecting electrode 13.

Figure 6:
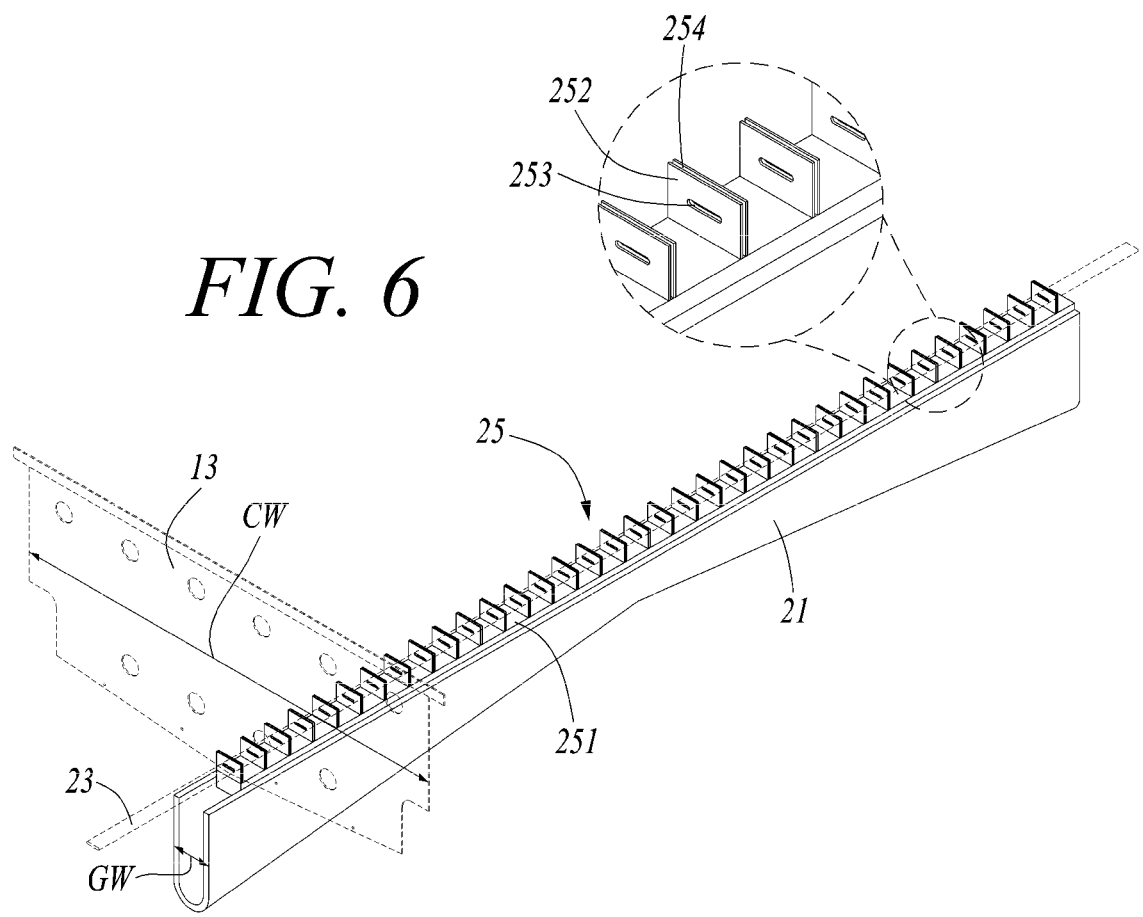
FIG. 6 is a perspective view illustrating a support hanger and a discharge guide according to the first embodiment of the present disclosure.

The discharge guide 21 is disposed at the widthwise center of the collecting electrode 13, and a width GW of the discharge guide 21 is substantially smaller than a width CW of the collecting electrode 13 (FIG. 6). For example, the discharge guide 21 may have a width GW ranging from 1/100 to 1/10 of the width CW of the collecting electrode 13.

In an embodiment, since the lower edge 134 of the collecting electrode 13 is inclined toward the widthwise center of the collecting electrode 13, i.e., from opposite side ends of the collecting electrode, the center is disposed at a lower position than either of the side ends. Thus, wash water flowing along the surfaces of the collecting electrode 13 is collected to the lowermost point 138, which is the lowest position along the lower edge of the collecting electrode 13 and in an embodiment may be the center of the collecting electrode 13.

A fixing hole 137 is formed in the center of the lower side of each of the collecting electrodes 13, near the lowermost point 138, and a hanger fixing rod 23 extending in the stacking direction of the collecting electrodes 13 is inserted though the fixing holes 137. The hanger fixing rod 23 is coupled to the support hanger 25 to fix the support hanger 25 to the collecting electrodes 13 (FIG. 6).

FIG. 6 illustrates the support hanger 25 and the discharge guide according to the first embodiment of the present disclosure.

Referring to FIG. 6, the support hanger 25 includes a lower support rod 251 extending in the stacking direction of the collecting electrodes 13, and connection protrusions 252 protruding upward from the lower support rod 251 to fit the lower edges of the collecting electrodes 13. Each of the connection protrusions 252 has a connection groove 254 formed for insertion of the lower edge of the associated collecting electrode 13, and a support hole 253 formed for insertion of the hanger fixing rod 23.

The connection protrusion 252 may consist of two spaced plates, and the connection groove 254 may be formed between the plates. The connection protrusions 252 are spaced apart from each other in the longitudinal direction of the lower support rod 251 to be coupled to the lower edges of the respective collecting electrodes 13. The support hole 253 is connected to the fixing hole 137 so that the hanger fixing rod 23 is installed through the support hole 253 and the fixing hole 137. Thus, the support hanger 25 may be stably fixed to the lower edge of the collecting electrode 13.

The discharge guide 21 is fixedly installed with respect to the support hanger 25 and may be fixed to the lower support rod 251 by welding or the like. The upper portion of the discharge guide 21 is open to form the discharge guide 21 as a channel so that wash water flows through the channel. The discharge guide 21 may be configured such that its bottom surface, i.e., the channel surface, gradually decreases in height from a longitudinal center toward either extreme (side end) of the discharge guide 21. Although the embodiment of the drawings depicts the discharge guide 21 having a highest point located at the guide's longitudinal center, the highest point may occur anywhere along the discharge guide.

Thus, the wash water introduced into the discharge guide 21 may flow to either side end of the discharge guide 21. Discharge pipes (not shown) for discharge of wash water may be connected to both side ends of the discharge guide 21.

According to the first embodiment as described above, since the lower edge 134 of the collecting electrode 13 is inclined and the support hanger 25 and the discharge guide 21 are installed with respect to the inclined lower edge of the collecting electrode 13, it is possible to stably discharge wash water while obstructing the flow of exhaust gas to a minimum.

As illustrated in FIGS. 2 and 3, each of the first tie rods 16 is fitted to the plurality of discharge electrodes 12 and is installed through the second holes 133 formed in the collecting electrodes 13 so as not to come into contact with the collecting electrodes 13. The plurality of first tie rods 16 are coupled to the upper portion of each discharge electrode 12 and to the lower portion of each discharge electrode 12. Among the plurality of first tie rods 16, the lower first tie rods 16 are fixed to a lower support 51 and the upper first tie rods 16 are fixed to an upper support 61. An end of each of the first tie rods 16 are provided with a threaded protrusion.

Each of the second tie rods 17 is fitted to the plurality of collecting electrodes 13 and is installed through the first holes 123 formed in the discharge electrodes 12 so as not to come into contact with the discharge electrodes 12. The second tie rods 17 are coupled to the respective upper and lower portions of each collecting electrode 13, and the longitudinal ends of the second tie rods 17 may be fixed to the collecting electrode 13, though the present disclosure is not limited to this configuration. That is, the second tie rods 17 may be fixed to another member in the absorption tower 1200.

Each of the first and second tie rods 16 and 17 may have a spacer installed to maintain the gap between the discharge electrode 12 and the collecting electrode 13. The spacer of the discharge electrode 12 may be installed such that it passes through the second hole 133 and the longitudinal end of the spacer abuts the surface of the discharge electrode 12. The spacer of the collecting electrode 13 may be installed such that it passes through the first hole 123 and the longitudinal end of the spacer abuts the surface of the collecting electrode 13.

Each of the first setting beams 14 extends in the stacking direction of the discharge electrodes 12 and is formed with a plurality of lower slots 143 into which the side ends of the respective discharge electrodes 12 are inserted. The first reinforcing rod 121 of each discharge electrode 12 is inserted through and installed on the first setting beams 14, and the lower end of the first reinforcing rod 121 is supported by the first setting beams 14.

Each of the second setting beams 15 extends in the stacking direction of the collecting electrodes 13 and is formed with a plurality of upper slots 156 into which the side ends of the respective collecting electrodes 13 are inserted. The upper slots 156 are spaced apart from each other in the longitudinal direction of the second setting beam 15, and the second setting beam 15 may be positioned above the first setting beam 14. As illustrated in FIG. 3, the center setting beam 18 is installed at the center of an upper portion of each collecting electrode 13 in the width direction. The center setting beam 18 has a T-shape and is formed with a plurality of slots into which the upper portion centers of the respective collecting electrodes 13 are inserted.

The second reinforcing rod 131 is fixed to each of the collecting electrodes 13 and is inserted into the second setting beams 15. The second reinforcing rod 131 is installed through the second setting beams 15 and the lower end of the second reinforcing rod 131 is supported by the second setting beams 15.

In the electrostatic precipitator module 100 according to the first embodiment as described above, the gaps between the respective discharge electrodes 12 and the respective collecting electrodes 13 can be maintained and stably fixed by the first tie rods 16, the second tie rods 17, the first setting beams 14, and the second setting beams 15.

Figure 7:
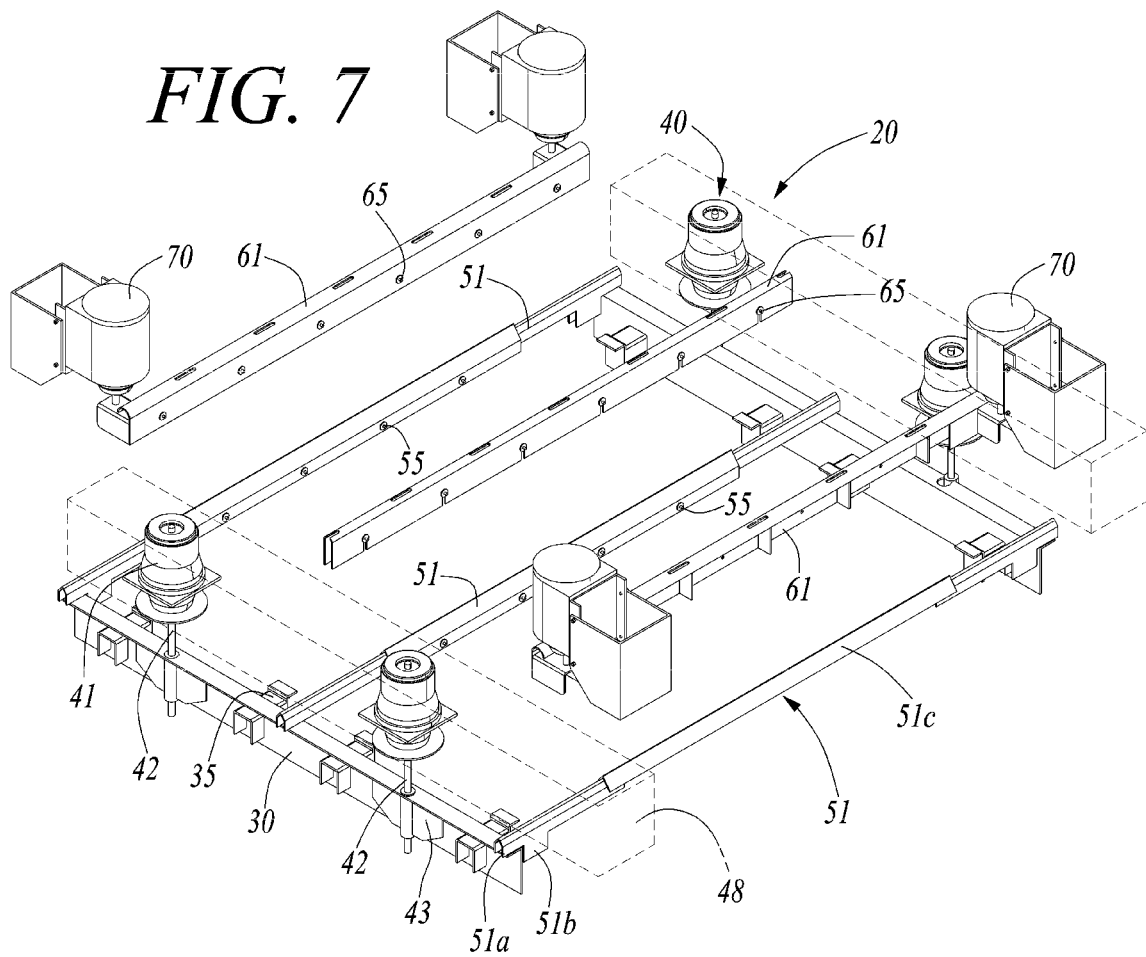
FIG. 7 is a perspective view illustrating a frame assembly according to the first embodiment of the present disclosure.

FIG. 7 illustrates the frame assembly 20 according to the first embodiment of the present disclosure.

Referring to FIGS. 2 and 7, the frame assembly 20 includes lower frames 30, a tubular girder 48, upper supports 61, lower supports 51, locking members 70, and insulating connection members 40.

The lower frames 30 extend in the stacking direction of the discharge and collecting electrodes 12 and 13 and are supported by the insulating connection members 40. Two lower frames 30 are disposed in parallel with each other, and two insulating connection members 40 are installed with respect to each of the lower frames 30. The lower frames 30 are each provided with a plurality of cradles 35 protruding inward, toward the opposite lower frame 30, and the first setting beams 14 are mounted on the cradles 35. The lower frames 30 are charged to the predetermined high voltage, whereby the first setting beams 14 and the discharge electrodes 12 are charged to the same high voltage through the lower frames 30.

The lower supports 51 are fixedly installed on the lower frames 30 and are respectively disposed on both outer sides and at the center of the electrostatic precipitator module 100. Each of the lower supports 51 includes side protruding portions 51a located on the lower frames 30, lower protruding portions 51b protruding downward to abut the side surfaces of the lower frames 30, and a support bar 51c to which the first tie rods 16 are fixed.

The lower support 51 has a plurality of connectors 55 installed for coupling of the first tie rods 16, and the first tie rods 16 are fixedly connected (screwed) to the connectors 55. The longitudinal one ends of the first tie rods 16 are fixed to the outer lower supports 51, and the longitudinal other ends thereof are fixed to the central lower support 51.

The insulating connection members 40 are installed with respect to the lower frames 30. Each insulating connection member 40 is provided with a high-voltage terminal rod 42 for applying the high voltage to the associated discharge electrodes 12 and with a lower insulator 41 for insulation from the terminal rod 42.

The high-voltage terminal rod 42 has an anchor 43 installed to support the associated lower frame 30. Thus, the high voltage is applied to the discharge electrodes 12 through the lower frames 30 and the first setting beams 14. The lower frames 30 are suspended from the insulating connection members 40.

The insulating connection members 40 are inserted into the tubular girder 48 having an internal space, and the tubular girder 48 is formed in the same direction as the lower frame 30. The tubular girder 48 may be fixedly installed on the inner wall of the absorption tower 1200 and may be provided with a purge air supply pipe (not shown)

The second setting beams 15 are fixed on the upper surface of the tubular girder 48. The lower ends of the second setting beams 15 may be fixed to the tubular girder 48 by welding or the like. The second setting beams 15 are disposed in the same direction as the longitudinal direction of the tubular girder 48.

The upper supports 61 are disposed in an upper side of the electrostatic precipitator module 100 and are respectively disposed on both outer sides and at the center of the electrostatic precipitator module 100.

Each of the upper supports 61 has a plurality of connectors 65 installed for coupling of the first tie rods 16, and the first tie rods 16 are fixedly connected (screwed) to the connectors 65. One end of each first tie rod 16 is fixed to one of the outer upper supports 61, and the other end is fixed to the central upper support 61.

The locking members 70 are connected to each of the outer upper supports 61 to press and support the upper support 61. In order to reduce the vibration of the electrostatic precipitator module 100, the locking members 70 are installed to press the upper support 61 in an inward direction.

The locking members 70 are fixed to the inner wall of the absorption tower 1200, and each locking member 70 has an upper insulator (not shown). A nozzle (not shown) for injection of air may be installed in each of the locking members 70 to prevent a short circuit, and a purge air supply pipe (not shown) for supplying air to the locking member 70 may be installed.

As shown in FIG. 2, the locking member 70 may include a connection rod 71 protruding downward, and a pressing support member 72 coupled to the lower end of the connection rod 71 to press the upper support 61 in a central direction. When the upper support 61 is installed in a pressed state as described above, the vibration of the electrostatic precipitator module 100 can be efficiently reduced.

Hereinafter, an electrostatic precipitator module according to a second embodiment of the present disclosure will be described.

Figure 8:
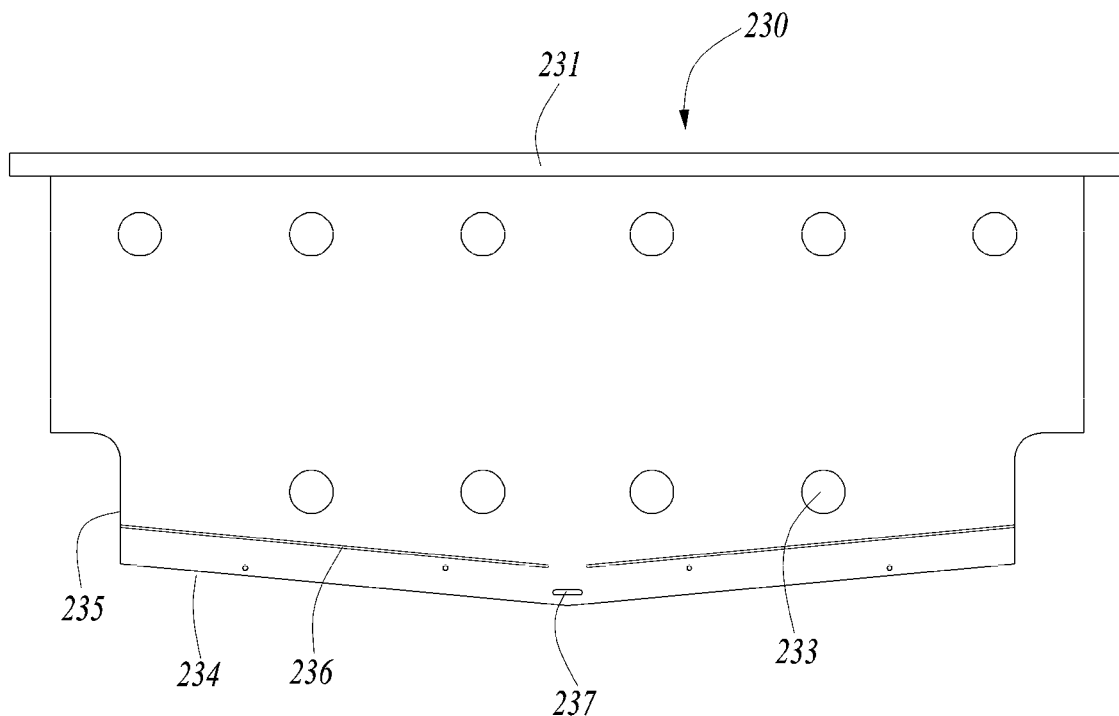
FIG. 8 is a front view illustrating one collecting electrode according to a second embodiment of the present disclosure.

FIG. 8 illustrates one collecting electrode 230 according to the second embodiment of the present disclosure.

Referring to FIG. 8, the electrostatic precipitator module according to the second embodiment has the same structure as the electrostatic precipitator module according to the first embodiment except for collecting electrodes 230. Therefore, a duplicate description of the same configuration will be omitted.

Each of the collecting electrodes 230 according to the second embodiment has a flat plate shape, and is formed with a plurality of second holes 233 through which the first tie rods 16 pass. The collecting electrode 230 includes a second reinforcing rod 231 disposed at the upper portion thereof to support the collecting electrode 230. The second reinforcing rod 231 is fixed to the upper end of the collecting electrode. The second reinforcing rod 231 is longer than the width of the collecting electrode 230 to protrude from both side ends of the collecting electrode 230. The collecting electrode 230 has clearance grooves 235 formed at both lower side ends.

The collecting electrode 230 may have a lower edge 234 inclined with respect to the ground, and a discharge guide is installed beneath the lowermost point of the inclined portion. The lower edge 234 of the collecting electrode 230 is inclined downward with respect to the ground from both side ends of the collecting electrode to its widthwise center. Accordingly, the center of the collecting electrode 230 is disposed at a lower position than either side end.

In addition, a guide protrusion 236 is formed on a lower portion of the collecting electrode 230 and is inclined downward toward the center of the collecting electrode 230. The inclined guide protrusion 236 extends from the widthwise side end of the collecting electrode 230 to its center. The inclined guide protrusion 236 is open at a position corresponding to the widthwise center of the collecting electrode 230, enabling the wash water flowing along the surface of the collecting electrode 230 to collect at the center of the collecting electrode, which is the lowest position of the collecting electrode 230 along its lower edge.

Each of the collecting electrodes 230 has a fixing hole 237 formed near the center of its lower edge, and the hanger fixing rod 23 extending in the stacking direction of the collecting electrodes 230 is inserted into the fixing hole 237. In addition, a discharge guide for the transfer of wash water is installed to the widthwise center of the collecting electrode 230.

According to the second embodiment as described above, it is possible to more reliably transfer wash water to the center of the collecting electrode 230 by the formation of the guide protrusion 236.

Hereinafter, an electrostatic precipitator module according to a third embodiment of the present disclosure will be described.

Figure 9:
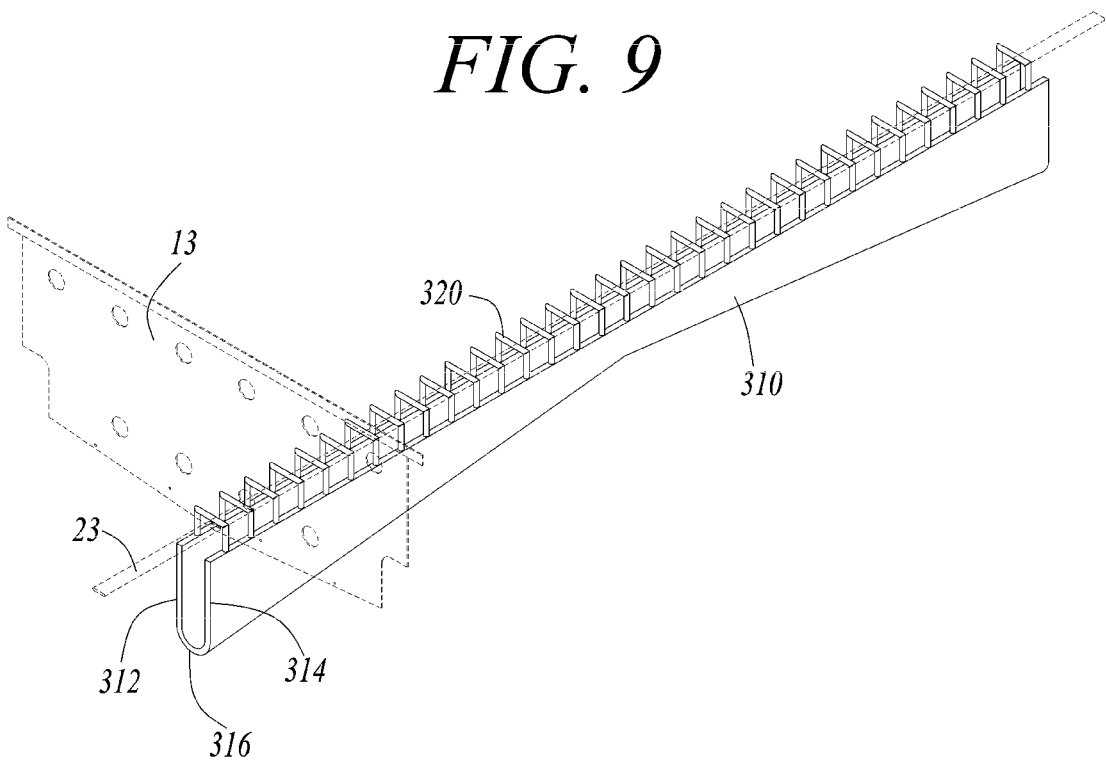
FIG. 9 is a perspective view illustrating a discharge guide according to a third embodiment of the present disclosure.

FIG. 9 illustrates a support hanger and a discharge guide 310 according to the third embodiment of the present disclosure.

Referring to FIG. 9, the electrostatic precipitator module according to the third embodiment has the same structure as the electrostatic precipitator module according to the first embodiment except for the discharge guide 310. Therefore, a duplicate description of the same configuration will be omitted.

The discharge guide 310 is fixedly installed with respect to the widthwise center of the lower edge of the collecting electrode and includes sidewalls 312 and 314 and a bottom plate 316 connected to the lower ends of the sidewalls 312 and 314. The sidewalls 312 and 314 may be disposed in parallel with each other, and the bottom plate 316 may have a curved surface for facilitating water flow.

Through such a structure, the upper portion of the discharge guide 310 is open to form a channel for the discharge of wash water as in the first embodiment. Since the longitudinal central bottom of the discharge guide 310 is higher than both side bottoms thereof, the wash water may flow to both side ends of the discharge guide. A discharge pipe for discharge of wash water may be connected to the longitudinal end of the discharge guide 310.

The discharge guide 310 has a plurality of support rings 320 protruding upward, and the support rings 320 are fixed to the upper ends of both sidewalls 312 and 314. The support rings 320 may be spaced apart from each other in the longitudinal direction of the discharge guide 310. The support rings 320 are caught by the hanger fixing rod installed to the lower portion of the collecting electrode 13.

According to the third embodiment as described above, since the support rings 320 are formed in the discharge guide 310, the discharge guide 310 can be stably fixed to the lower portion of the collecting electrode.

As is apparent from the above description, in accordance with the exemplary embodiments of the present disclosure, it is possible to discharge wash water with more ease since the wash water is is guided to the lowermost point of each collecting electrode when the lower edge of the collecting electrode is formed to be inclined downward.

While the present disclosure has been described with respect to the specific embodiments with reference to the drawings, the present disclosure is not limited thereto. It will be apparent to those skilled in the art that various changes and modifications may be made without departing from the spirit and scope of the disclosure as defined in the following claims.

What is claimed is:

1. An electrostatic precipitator module comprising:
an arrangement of discharge electrodes and collecting electrodes alternately disposed and spaced apart from each other, the discharge electrodes configured to be charged to a predetermined voltage for generating a corona discharge between the discharge electrodes and the collecting electrodes; and
tie rods for fixing the discharge electrodes and the collecting electrodes,
wherein each of the collecting electrodes has a lower edge inclined downward with respect to the ground,
wherein each of the collecting electrodes includes a guide protrusion which is formed on a lower portion of each collecting electrode and is inclined downward toward a center of each collecting electrode such that wash water flowing along surfaces of the collecting electrode is transferred toward the center of the collecting electrode, the guide protrusion extending in a width direction of the collecting electrode, and wherein the guide protrusion is open at a position corresponding to a widthwise center of each collecting electrode to collect the wash water flowing along surfaces of the collecting electrode at the center of the collecting electrode.

2. The electrostatic precipitator module according to claim 1, wherein the lower edge of each collecting electrode includes separate lower edge portions respectively inclined downward from opposite side ends of the collecting electrode.

3. The electrostatic precipitator module according to claim 1, wherein the lower edge of each collecting electrode includes a lowermost point at which wash water flowing down from the collecting electrode is concentrated and discharged to a discharge guide installed directly under the lowermost points.

4. The electrostatic precipitator module according to claim 3, wherein the discharge guide has a width smaller than that of the collecting electrode.

5. The electrostatic precipitator module according to claim 3, wherein the discharge guide has a width ranging from 1/100 to 1/10 of that of the collecting electrode.

6. The electrostatic precipitator module according to claim 3, wherein the discharge guide extends in a stacking direction of the collecting electrodes and has a bottom surface that decreases in height toward either extreme of the discharge guide.

7. The electrostatic precipitator module according to claim 3, wherein each collecting electrode has a fixing hole formed near the lower edge to receive a hanger fixing rod.

8. The electrostatic precipitator module according to claim 7, wherein:
the hanger fixing rod is coupled with a support hanger for supporting the discharge guide; and
the support hanger comprises a plurality of connection protrusions protruding upward for insertion of the lower portions of the respective collecting electrodes, and each of the connection protrusions has a support hole formed for insertion of the hanger fixing rod.

9. The electrostatic precipitator module according to claim 7, wherein the discharge guide comprises two sidewalls and a bottom plate connected to lower portions of the sidewalls, and the discharge guide has a plurality of support rings protruding upward from the sidewalls to be coupled to the hanger fixing rod.

10. The electrostatic precipitator module according to claim 1, further comprising:
a first reinforcing rod that is fixedly installed at and protrudes from a lower portion of each discharge electrode and is configured to be inserted into slots formed in first setting beams respectively disposed at opposite ends of the first reinforcing rod,
wherein the first setting beams are installed to pass through clearance grooves respectively formed in both ends of the lower side of each of the collecting electrodes.

11. The electrostatic precipitator module according to claim 10, further comprising a second reinforcing rod that is fixedly installed at and protrudes from an upper portion of each collecting electrode and is configured to be inserted into slots formed in second setting beams respectively disposed at opposite ends of the second reinforcing rod.

12. The electrostatic precipitator module according to claim 1, wherein the tie rods are inserted into the discharge electrodes to fix the discharge electrodes and comprise:
first tie rods passing through second holes formed in the collecting electrodes, and
second tie rods inserted into the collecting electrodes to fix the collecting electrodes while passing through first holes formed in the discharge electrodes.

* * * * *